United States Patent
Loaiza et al.

(10) Patent No.: US 12,182,100 B2
(45) Date of Patent: Dec. 31, 2024

(54) USER-SPECIFIED CHAINS AND ROW VERSIONS IN A BLOCKCHAIN TABLE

(71) Applicant: Oracle International Corporation, Redwood Shores, CA (US)

(72) Inventors: Juan R. Loaiza, Woodside, CA (US); Sachin Vijakumar Sonawane, Foster City, CA (US); Mahesh Baburao Girkar, Los Altos, CA (US); Wei-Ming Hu, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/476,207

(22) Filed: Sep. 27, 2023

(65) Prior Publication Data

US 2024/0119041 A1    Apr. 11, 2024

Related U.S. Application Data

(60) Provisional application No. 63/414,998, filed on Oct. 11, 2022.

(51) Int. Cl.
  *G06F 16/22*    (2019.01)
  *G06F 16/23*    (2019.01)

(52) U.S. Cl.
  CPC ...... *G06F 16/2365* (2019.01); *G06F 16/2282* (2019.01); *G06F 16/2379* (2019.01)

(58) Field of Classification Search
  CPC ............ G06F 16/2365; G06F 16/2282; G06F 16/2379; H04L 9/0894; H04L 9/3239; H04L 9/3297; H04L 9/50
  See application file for complete search history.

(56) References Cited

U.S. PATENT DOCUMENTS

| | | | |
|---|---|---|---|
| 8,156,083 B2 | 4/2012 | Banerjee et al. | |
| 9,384,222 B2 | 7/2016 | Banerjee et al. | |
| 11,438,143 B2* | 9/2022 | Collins | H04L 9/0643 |
| 11,626,992 B2* | 4/2023 | Kanza | H04L 9/3239 |
| | | | 713/178 |
| 11,640,391 B2* | 5/2023 | Loaiza | H04L 9/0643 |
| | | | 707/703 |

(Continued)

OTHER PUBLICATIONS

Wang et al., "Formal Specification and Verification of Smart Contracts in Azure Blockchain", dated Apr. 29, 2019, 13 pages.
Samaniego et al., "Blockchain as a Service for IoT", 2016 IEEE International Conference on Internet of Things (iThings), 4 pages.
Rimba et al., "Comparing Blockchain and Cloud Services for Business Process Execution", dated n 2017, 4 pages.

(Continued)

*Primary Examiner* — Jorge A Casanova
(74) *Attorney, Agent, or Firm* — Hickman Becker Bingham Ledesma LLP; Marcel K. Bingham

(57) ABSTRACT

A blockchain object stores multiple user blockchains, each blockchain comprising an ordered set of records in the blockchain object. The records of a user blockchain have the same blockchain key value. Users can create multiple blockchains by establishing respective blockchain key values for the blockchains. Like blocks in a blockchain, the records in a user blockchain are ordered by a sequence of numbers that is specific to the user blockchain; each user blockchain has its own sequence of numbers. Each record in a user blockchain holds a sequence number in a field of the blockchain object. An efficient mechanism maintains and assigns a sequence number to a record when appended to a user blockchain.

26 Claims, 5 Drawing Sheets

(56) References Cited

U.S. PATENT DOCUMENTS

| | | | | |
|---|---|---|---|---|
| 11,663,197 | B2* | 5/2023 | Yegorin | G06F 16/2379 |
| | | | | 707/703 |
| 11,720,549 | B1* | 8/2023 | McKervey | H04L 9/3239 |
| | | | | 707/690 |
| 12,034,859 | B2* | 7/2024 | Davies | H04L 9/3239 |
| 2002/0095408 | A1 | 7/2002 | Cheng | |
| 2014/0379679 | A1 | 12/2014 | Kohno | |
| 2017/0228371 | A1 | 8/2017 | Seger, II | |
| 2018/0096163 | A1 | 4/2018 | Jacques et al. | |
| 2019/0179939 | A1 | 6/2019 | Govindarajan et al. | |
| 2020/0050613 | A1 | 2/2020 | Gauvreau, Jr. | |
| 2020/0142992 | A1 | 5/2020 | Ocher et al. | |
| 2020/0250177 | A1 | 8/2020 | Padmanabhan | |
| 2021/0073209 | A1 | 3/2021 | Loaiza et al. | |
| 2021/0374273 | A1* | 12/2021 | Chen | G06F 21/44 |
| 2022/0058186 | A1* | 2/2022 | Yang | G06F 16/2365 |
| 2022/0414090 | A1* | 12/2022 | Qiu | G06F 16/2453 |

OTHER PUBLICATIONS

Ellis et al., "ChainLink A Decentralized Oracle Network", dated Sep. 4, 2017, 38 pages.

Anonymous: "Learning Key 20c New Features for Database Administrators", Details: Oracle Blockchain Table, dated Feb. 14, 2020, 4 pages.

Allen et al., "Veritas: Shared Verifiable Databases and Tables in the Cloud", CIDR'19, dated Jan. 2019, CA, 9 pages.

"16.9 Using Flashback Data Archive", Oracle Database Development Guide, 12c Release 1 (12.1), May 2016, 4 pages.

"Introduction to Workspace Manager", Oracle Database, available: https://docs.oracle.com/en/database/oracle/oracle-database/23/adwsm/introduction-to-workspace-manager.html#GUID-CF637BD7-E00C-4495-8D83-B9C805E3BBE1, retreived Jan. 31, 2024. Publication Date: Unknown.

* cited by examiner

FIG. 1

| | SYSTEM BLOCKCHAIN COLUMNS 140 | | | | APPLICATION COLUMNS 150 |
|---|---|---|---|---|---|
| BLOCKCHAIN KEY 130 | BLOCKCHAIN HASH 142 | SEQUENCE NUM 144 | LAST APPENDED 146 | TIMESTAMP 148 | |
| 1234 | 12FH | 1 | NULL | 20210122@14 376015 | ••• |
| 1234 | X57A | 2 | NULL | 20210123@94 39674 | ••• |
| 3214 | YA21 | 1 | NULL | 20210122@19 746034 | ••• |
| 1234 | 4E6C | 3 | NON-NULL | 20210124@00 89117 | ••• |
| 3214 | 9FG3 | 2 | NON-NULL | 20210122@24 696285 | ••• |

BLOCKCHAIN TABLE 110
USER BLOCKCHAIN 151
USER BLOCKCHAIN 152

R11, R12, R13, R14, R15

LAST APPENDED INDEX 180
(Only non-null values appended)

USER-SPECIFIED CHAINS AND ROW VERSIONS IN A BLOCKCHAIN TABLE

CROSS REFERENCE TO RELATED APPLICATIONS

The present invention is a non-provisional application having priority to provisional application No. 63/414,998 filed on Oct. 11, 2022. The present application is also related to "Supporting Blockchain Collections in a Database," to Juan R. Loaiza, U.S. patent application Ser. No. 16/923,279, filed on Jul. 8, 2020, which is incorporated herein by reference.

FIELD OF THE INVENTION

The present invention relates to incorporating blockchain technology into a database with user-specified access to a user blockchain.

BACKGROUND

Users of blockchain technology rely on cryptographic security provided within blockchain ledgers. To support blockchain technology, a database management system (DBMS) may include blockchain tables. A blockchain table contains rows that are chained through cryptographic hashes based on a previous row hash and current row content. All rows in the blockchain table are, in effect, blocks in a single blockchain.

A table in a DBMS represents instances of an entity, with each row representing an instance of the entity. For example, a table may represent instances of transactions in banking accounts, each row representing a transaction.

There may be scenarios in which it is desirable to implement multiple blockchains to represent instances of multiple entities represented by a table, where each blockchain represents instances of one of the entities. For example, it may be desirable to form respective blockchains for transactions of multiple accounts, where each blockchain holds the transactions of one of the multiple accounts.

Because a blockchain table supports only one blockchain, a blockchain table is not used to implement multiple blockchains within a single table that is intended to represent instances of multiple entities. Instead, multiple blockchain support is provided by implementing adjunct blockchain functionality. For example, a separate blockchain in a separate blockchain table or blockchain application is used to maintain each blockchain needed for the single table. Such adjunct functionality adds complexity and difficulty to implementing multiple blockchains for a blockchain table.

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a diagram depicting a user blockchain table within a database in accordance with an embodiment of the present invention.

DETAILED DESCRIPTION

Figure 2:
FIG. 2 is a diagram depicting a procedure for appending rows to a blockchain table according to an embodiment of the present invention.

In the following description, for the purposes of explanation, numerous specific details are set forth to provide a thorough understanding of the present invention. It will be apparent, however, that the present invention may be practiced without these specific details. In other instances, structures and devices are shown in block diagram form to avoid unnecessarily obscuring the present invention.

General Overview

Described herein is a blockchain table that stores multiple blockchains, each blockchain comprising an ordered set of rows in the blockchain table. The blockchain table includes a blockchain key. The rows of a blockchain have the same blockchain key value. The blockchains in the blockchain table are referred to herein as user blockchains because users can create multiple blockchains by establishing respective blockchain key values for the blockchains.

Like blocks in a blockchain, the rows in a user blockchain are ordered by a sequence of numbers that is specific to the user blockchain; each user blockchain has its own sequence of numbers. Each row in a user blockchain holds a sequence number in a sequence number column of the blockchain table. Also described herein is an efficient mechanism for maintaining and assigning a sequence number to a row when appended to a user blockchain.

User blockchains are described in the context of a DBMS that supports a relational database, where a collection of records is stored as rows in a table. However, records can also be documents stored in a Document DBMS in the JSON format where the user chain is a collection of documents which have identical values for one or more document attributes (for example, 'author' of the document).

Illustrative Blockchain Table

FIG. 1 depicts blockchain table 110, a blockchain table according to an embodiment of the present invention. Blockchain table 110 is managed by a DBMS not depicted in FIG. 1. For purposes of exposition, FIG. 1 depicts only five rows in blockchain table 110, which are rows R11, R12, R13, R14, and R15.

The columns of blockchain table 112 comprise BLOCKCHAIN KEY 130. BLOCKCHAIN KEY 130 holds blockchain key values. As mentioned before, a user blockchain comprises rows that contain the same blockchain key value. For purposes of illustration, blockchain key values depicted in FIG. 1 are account numbers. Rows R11, R12 & R14, which comprise user blockchain 151, hold the same account number 1234 in BLOCKCHAIN KEY 130. Rows R13 & R15, which comprise user blockchain 152, hold the same account number 3214 in BLOCKCHAIN KEY 130.

When creating and/or altering the definition of a blockchain table, a column that comprises the blockchain key is specified. For example, a DDL command is issued to a DBMS to define a blockchain table, the DDL command identifying the table as a blockchain table and declaring or otherwise specifying a column that is a blockchain key. The definition of the blockchain table, and the column as a blockchain key, are stored in a database dictionary of the database managed by the DBMS.

A blockchain key may be a composite key comprised of multiple columns. The column values of a row of a composite blockchain key may be referred to collectively as a blockchain key value.

Blockchain table 110 includes system blockchain columns 140, which are columns managed by a DBMS to provide blockchain table 110 with its blockchain properties and characteristics. Operations in which the system blockchain columns 140 are populated and updated shall be later described. In general, these operations are performed at commit time. Users of blockchain table 110 cannot change the column value of any of system blockchain columns 140 by issuing database manipulation (DML) commands directed to any of system blockchain columns 140.

Column SEQUENCE NUMBER 144 holds a distinct sequence of numbers for each user blockchain stored in blockchain table 112. For example, user blockchain 151, comprising R11, R12, and R14, holds serial numbers 1, 2, and 3 in SEQUENCE NUMBER 144, respectively. A row in a user blockchain is referred to as being the previous row to another row in the user blockchain when the row holds the sequence number that is previous to that of the other row; conversely, a row in a user blockchain is referred as being the subsequent row to another row in the user blockchain when the row holds the serial number that is subsequent to that of the other row. Thus, in user chain 151, row R12 is the previous row of row R14 and the subsequent row to row R11.

Column BLOCKCHAIN HASH 142 holds blockchain hash values ("blockchain hash") that cryptographically link rows in the user blockchain. Similar to blocks in a blockchain, a blockchain hash for a row in a user blockchain is generated by applying a hash function to inputs that include column values of the row and the blockchain hash value held in the previous row. In an embodiment, the hash function implements a secure hashing algorithm (SHA), such as SHA2-512.

Column LAST APPENDED 146 holds a NULL value in the rows of a user blockchain except for the last row in the user blockchain, which holds a particular non-null value. The last row in a user blockchain is the row holding the highest sequence number in sequence number 144. Thus, last rows R13 and R15 in user blockchains 151 and 152 hold the non-null value in LAST APPENDED 146, respectively, while the remaining rows in these user blockchains hold the null value in LAST APPENDED 146. The reason for storing null and non-values in this way is that it enables an index that may be used to efficiently retrieve the last appended row, information that is needed when appending a new row, as explained below.

COLUMN TIMESTAMP 148 holds time values of when the insert of a row in blockchain table 110 into blockchain table 110 is appended. In an embodiment, for the rows of a given user chain, the relative order of time values in timestamp 148 among the rows reflects the order of sequence numbers in SEQUENCE NUMBER 144 among the rows.

Application columns are columns that a user may set directly in a row within a database transaction before committing the row in the database transaction. Specifically, users of blockchain table 110 may set the column values of application columns 150 for a row within a database transaction by issuing database commands that specify database manipulation operations directed to any of application columns 150 within the database transaction. A column that comprises a blockchain key is an application column. An example of an application column for blockchain table 110 is a column for a dollar amount, a column for bank transaction data and time, and a column for bank transaction numbers.

Hashed Content

The input applied to a hash function to generate a blockchain hash for a row in a blockchain table is referred to as hashed input. In general, hashed input should comprise content in the blockchain that is expected to be immutable. In an embodiment, hashed content for a row in the blockchain table 110 includes column values that a user may set explicitly in DML commands, such as the blockchain key value and values of application columns 150. The hashed content also includes the blockchain hash of the previous row. Some system blockchain columns used by the DBMS to manage a user blockchain may change after committing a row and are not part of the hashed content. In an embodiment, such columns include LAST APPENDED 146.

Last Row Resolution

Last row resolution refers to the operation of determining the last row appended to a user blockchain and/or obtaining a reference to the location of the row. Data from the last row appended to a user blockchain is needed when appending a new row, data such as the row's blockchain hash value and the sequence number of the row. The sequence number is incremented by one to generate the sequence number for the new row.

In an embodiment, last row resolution uses last appended index 180 to efficiently perform last row resolution. The index keys of last appended index 180 are BLOCKCHAIN KEY 130 and LAST APPENDED 146. Because the last row is the only row in the user blockchain holding the non-null value in LAST APPENDED 146, the last row is found by accessing last append index 180 to find only the row in blockchain table 110 that is indexed to the blockchain key value of the user blockchain and the non-null value.

Last appended index 180 is "sparsely" populated with non-null values because only the last row in each user blockchain includes the non-null value while the rest of the rows hold the null value. A DBMS may not create or retain an index entry in an index for a row that includes a null value in an index key of the index. As a result, the number of index entries in last append index 180 is vastly smaller as compared to the number of rows in blockchain table 112. A table index that indexes vastly fewer rows than are in the table is referred to herein as a sparse index.

A sparse index on a table is accessed far more quickly relative to a non-sparse index. Also, in a DBMS that supports transactional consistency, an index is maintained in a transactionally consistent manner with the table indexed by the index. Thus, the use of the last appended index, as described above, uses the native capabilities of a DBMS to efficiently track the last row and highest sequence number for a user blockchain while maintaining transactional consistency.

To maintain the sequence numbering for a user blockchain, a database transaction performs the following operations when appending a new row to a user blockchain. The DBMS determines the last sequence number for the user blockchain using last row resolution, retrieves the row and reads the sequence number of the row, increments the sequence number by one, and updates the new row to the incremented sequence number. In addition, the DBMS inserts the non-null value in LAST APPENDED 146 of the new row and updates LAST APPENDED 146 of the previous appended row in the user blockchain to null. The transaction is thereafter committed.

Once the transaction is committed, the new row becomes the last appended row. Last append index 180 indexes the new row to the non-null value (and respective blockchain key value of the row) and no longer indexes the former last appended row in last append index 180.

In an embodiment, the sequence number and block hash of the last appended rows are cached in an in-memory buffer, where the buffer contains buffer entries that contain the block hash and sequence of the last appended row for a particular user blockchain. The DBMS maintains the buffer using buffer cache management policies. For example, buffer entries may be maintained only for user blockchains to which rows are most recently and frequently appended. Data from the last row appended to a user blockchain needed to append a new row may be retrieved from the buffer. The buffer may be updated when the new row is appended.

Locking to Synchronize Update Last Sequence Number

There may be multiple database transactions that are more or less concurrently appending a new row to a user blockchain. To synchronize the operations between the database transactions generating sequence numbers, a database transaction, in effect, exclusively locks the user blockchain before performing these operations.

In an embodiment, enqueue locking is used for exclusively locking a user blockchain within the DBMS. Under enqueue locking, exclusive locks are issued on "enqueue values", each issued lock locking a particular enqueue value. To exclusively lock a user blockchain system-wide within a DMBS, a database transaction generates an enqueue value uniquely representing the user blockchain and then locks the enqueue values.

In an embodiment, the enqueue values are unique hash values that are generated for each of the multiple user blockchains. The unique hash values are generated so that a hash value generated by database transactions for the same user blockchain is the same, while hash values generated for different user blockchains are different.

In order for the hash values generated by a hash algorithm/function to be unique among those generated for user blockchains, the input used for each user blockchain to the hash algorithm/function used to generate the hash values must be unique among user blockchains. A blockchain key value by itself may not be unique because multiple blockchains in different blockchain tables may contain the same blockchain key value. However, each blockchain table may be associated with a unique database object id. Thus, any combination of a blockchain key value and database object ID of a blockchain table is unique within a database. This combination may be used as input for generating unique hash values in an embodiment.

In an embodiment, a DBMS may include multiple databases. Among the multiple databases, a database object id of the blockchain table in a database may be identical to that of another blockchain table in another database. However, within a DBMS with multiple databases, each database is associated with a database ID that is unique within the DBMS. Thus, any combination of a blockchain key value, the database object ID of a blockchain table, and the database ID of the database that contains the blockchain table is unique within the DBMS. This combination may be used as input for generating unique hash values in an embodiment.

Lock Ordering to Avoid Deadlocks

Multiple database transactions may be appending a row to multiple user blockchains and thus need to acquire multiple locks on multiple user blockchains. It is possible that deadlocks can occur due to lock acquisitions between multiple database transactions.

According to an embodiment, lock acquisition ordering is used to avoid deadlocks. When locking multiple user blockchains, a database transaction acquires the locks for each of the user blockchains in the same relative order. The ordering is based on unique enqueue values that are generated for each of multiple user blockchains.

Appending Rows to User Blockchains

FIG. 2 is a diagram depicting a procedure for appending rows to a blockchain table according to an embodiment of the present invention. The term appending a row to user blockchain refers to operations performed by a DBMS to generate and populate column values of the row and commit the row in such a way that the row has the next highest sequence number of the sequence numbers contained in the rows already belonging to user blockchain. Appending a row to the user blockchain may entail the DBMS processing a DML insert command issued by a user to insert the row, generating system column values and updating the row, and committing the row to the blockchain table.

The procedure in FIG. 2 is illustrated using blockchain table 110 and a database transaction being executed by a DBMS; the database transaction is inserting multiple rows to respective user blockchains in blockchain table 110.

Within the database transaction, the DBMS executes multiple DML commands that each insert a row into blockchain table 110. (208) The DBMS executes the DML commands in response to a request to execute the DML commands issued by a client application. Each DML command specifies a different blockchain key value and specifies values for application columns. In the current illustration, the DBMS is executing within a database transaction two DML commands to insert a row into blockchain table 110 having a blockchain key value of 1234 and 3214, respectively, and thus appending a row into user blockchain 151 and user blockchain 152, respectively. The DML commands also specify values for application column 150.

Next, the DBMS receives a command to commit the database transaction. (212) In response to receiving the command, the DBMS commences operations to commit the database transaction. When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

To commence commit time operations, the DBMS generates enqueue values for each of the rows to append. (224) In the current illustration, the blockchain table 110 has a database object ID, and the database that contains blockchain table 110 has a database ID. The DBMS generates a two enqueue value by applying a hash function to an input that includes a combination of the blockchain key value 1234, the database object ID, and the database ID to generate a respective enqueue value for user blockchain 151 and by applying a hash function to an input that includes a combination of the blockchain key value 3241, the database object id, and the database id to generate a respective enqueue value for user blockchain 152.

Next, the DBMS issues enqueue locks against the just generated enqueue values. (228) The enqueue locks are issued in enqueue value order.

The DBMS then performs last row resolution for each of the user blockchains to which rows are being appended by the database transaction. (232) In the current illustration, the DBMS accesses last appended index 180 to lookup the only rows in user blockchain 151 and user blockchain 152 that are indexed to non-null values, which are rows R14 and R15, the last appended rows to these user blockchains. The DBMS then retrieves rows R14 and R15 and retrieves the sequence number and blockchain hash from columns SEQUENCE NUMBER 144 and BLOCKCHAIN HASH 142, respectively. (236)

Next, the DBMS generates system column values for the new rows and updates the system columns with these values. (240) In the current illustration, the DBMS increments each of the retrieved sequence numbers by one to generate new sequence numbers and generates new blockchain hashes based on the hashed content of the new rows, including the retrieved blockchain hashes. The DBMS also generates new timestamp values reflecting the current time. The DBMS then updates in rows R14 and R15 columns BLOCKCHAIN HASH 142, SEQUENCE NUMBER 144, and TIMESTAMP 148 to the respective new blockchain hashes, new sequence numbers, and new timestamp values, respectively.

The DBMS updates the column LAST APPENDED 146 of the new rows to a non-null value (244) and updates the column LAST APPENDED 146 of rows R14 and R15 to NULL (244). Finally, the DBMS commits the database transaction.

Appending of new rows has been illustrated by appending multiple rows to the same blockchain table. However, the procedure in FIG. 2 may be to append multiple rows to multiple blockchain tables by a same database transaction.

Supplemental Blockchains

In an embodiment, for additional trust and security, whenever a row is appended to a user blockchain, an additional counterpart row is appended to a "supplemental blockchain". The supplemental blockchain is a table that includes the same application columns as the blockchain table and shares some of the system blockchain columns. The additional row appended to a supplemental blockchain for a row in a blockchain table is referred to herein as the supplement row of the row in the blockchain table.

Figure 3:
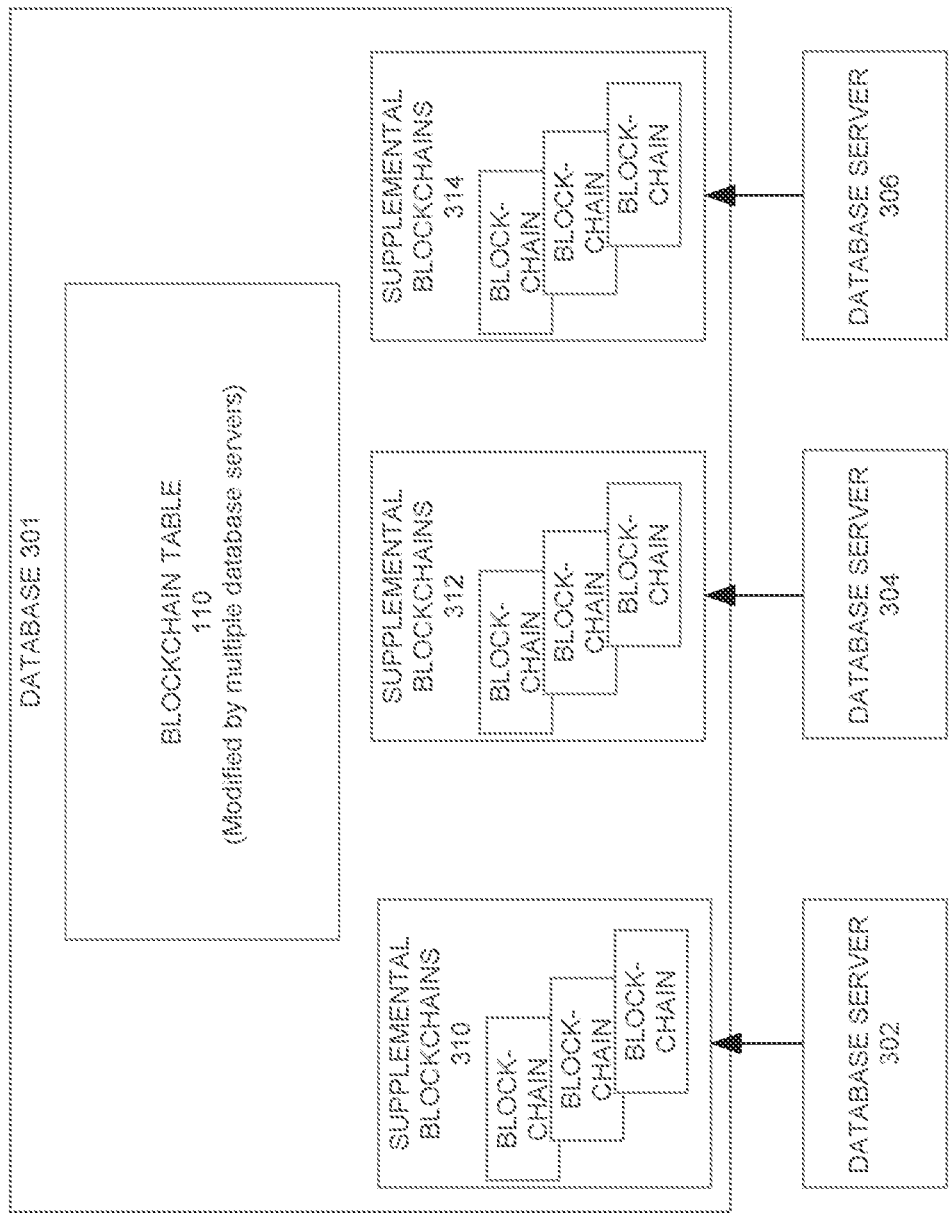
FIG. 3 is a diagram depicting an arrangement of the blockchain tables and supplemental blockchains in accordance with an embodiment of the present invention.

FIG. 3 depicts an approach that uses supplemental blockchains in a multi-node DBMS that comprises multiple database servers. Referring to FIG. 3, it depicts multi-node DBMS 300, which comprises multiple database servers 302, 304, and 306. These database servers collectively manage, provide, and share access to database 301. Database 301 includes blockchain table 110, and each of database servers 302, 304, and 306 share access to blockchain table 110 and may execute DML commands issued against the blockchain table.

At commit time, a database server appends a row to both blockchain table 110 and a supplement blockchain. Unlike for a blockchain table, where only a user blockchain is, in effect, locked within a blockchain table to append a row to the user blockchain, an entire supplemental blockchain is locked to append a row. To reduce lock contention on a supplemental blockchain, multiple supplemental blockchains are used for a blockchain table. Furthermore, each database server uses its own set of multiple supplemental blockchains. Database servers 302, 304, and 306 use supplemental blockchains 310, 312, and 314, respectively.

When a row is appended by a database server of DBMS 300 to blockchain table 110, the database server selects a supplemental blockchain among its corresponding supplemental blockchains to append the respective supplemental row. Respective supplemental rows of a user blockchain may be distributed across multiple supplemental blockchains of supplemental blockchains 310, 312, and 314.

The application column values, including the blockchain key value, are the same for a supplemental row and its respective blockchain table row. Among the system columns, the timestamp column of the supplemental chain is the same, but the blockchain hash and sequence number values are different. The blockchain hash and sequence number of a supplemental row in a supplemental blockchain are based on the blockchain hash of the row previously appended to the supplement blockchain. Like a blockchain table, the relative order of the timestamp values in the timestamp column among the rows in a supplemental blockchain reflects that of the sequence numbers of the rows.

A supplemental blockchain may include no counterpart to the column LAST APPENDED 146. There is very little or no need to use an index to track potentially multitudes of last appended rows within a single supplemental blockchain as there could be for a blockchain table. Appending a row depends only on the one row last appended in the entire supplemental blockchain, and this may be efficiently tracked without an index.

Deleting Rows in a User Blockchain

In an embodiment, individual rows in a blockchain table cannot be deleted in response to DML commands specifying to delete the individual row. Generally, only prefix rows in a user blockchain can be deleted. A prefix of rows in a user blockchain includes all rows in the user blockchain that have a sequence number up to a particular sequence number. According to an embodiment, rows of a user blockchain are deleted by issuing a command to delete a prefix and specifying a target timestamp value for the prefix. In response, a delete prefix operation is performed, in which the prefix of rows having a timestamp value equal to or less than the target timestamp value are deleted from the user blockchain.

A prefix delete operation may delete all rows of a user blockchain. Afterward, it is possible that a new row needs to be appended to the user blockchain. The appending operation requires the blockchain hash and sequence number of the last appended row, which has been deleted. In an embodiment, when a prefix delete operation deletes all rows of a user blockchain, the blockchain hash and sequence number of the last appended row are saved in the database dictionary of the DBMS. When a new row is appended to a completely deleted user blockchain, the blockchain hash and sequence number of the last appended row for the user blockchain are retrieved from the database dictionary.

In an embodiment that uses supplemental blockchains, a prefix in the supplemental blockchain may contain rows for many user blockchains. Deleting one or more rows for one or a subset of the user blockchains in a blockchain table and the corresponding supplemental rows may leave gaps in the sequence numbers in the remaining rows of supplemental blockchains. Thus, in such an embodiment, a prefix delete operation is not performed on a user blockchain basis. Rather, a target timestamp is specified for the entire blockchain table and the supplemental blockchains, thus ensuring complete prefixes are removed from the blockchain table and the supplemental blockchains.

User Blockchains in Various Forms of DBMSs

Embodiments of user blockchains can be implemented in DBMSs that support various forms of databases other than relational databases; a database object may be one of various forms of a collection of records. In a DOCS, the records in a collection are documents. A blockchain key may be a field in the collection of documents. Documents that belong to a user chain in a collection of documents contain the same blockchain key value. Other fields in the collection may be application fields that may be set by a user in a database transaction that creates the database object. In general, a collection of records, such as a database table of rows with columns or a collection of documents with fields, that stores user blockchains is referred to as a blockchain collection of records or a blockchain database object.

Database Management Systems

A database management system (DBMS) manages a database. A DBMS may comprise one or more database servers. A database comprises database data and a database dictionary that is stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON. The attributes are referred to as JSON fields. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

A database command may also be in the form of an API call. The call may include arguments that each specifies a respective parameter of the database command. The parameter may specify an operation, condition, and target that may be specified in a database statement. A parameter may specify, for example, a column, field, or attribute to project, group, aggregate, or define in a database object.

In a DOCS, a database command may be in the form of functions or object method calls that invoke CRUD (Create Read Update Delete) operations. Create, update, and delete operations are analogous to insert, update, and delete operations in DBMSs that support SQL. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
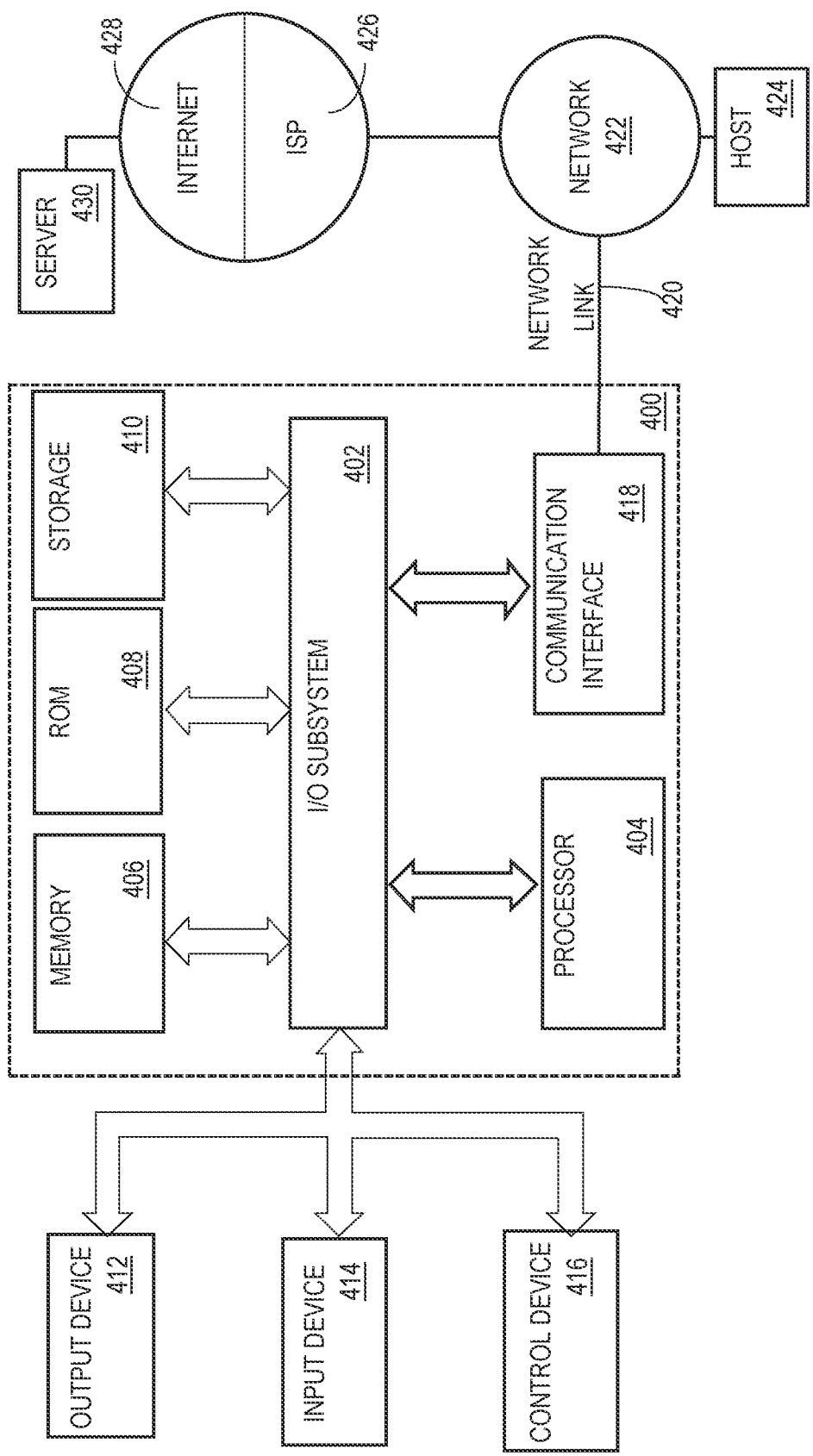
FIG. 4 is a diagram depicting a computer system that may be used to implement an embodiment of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
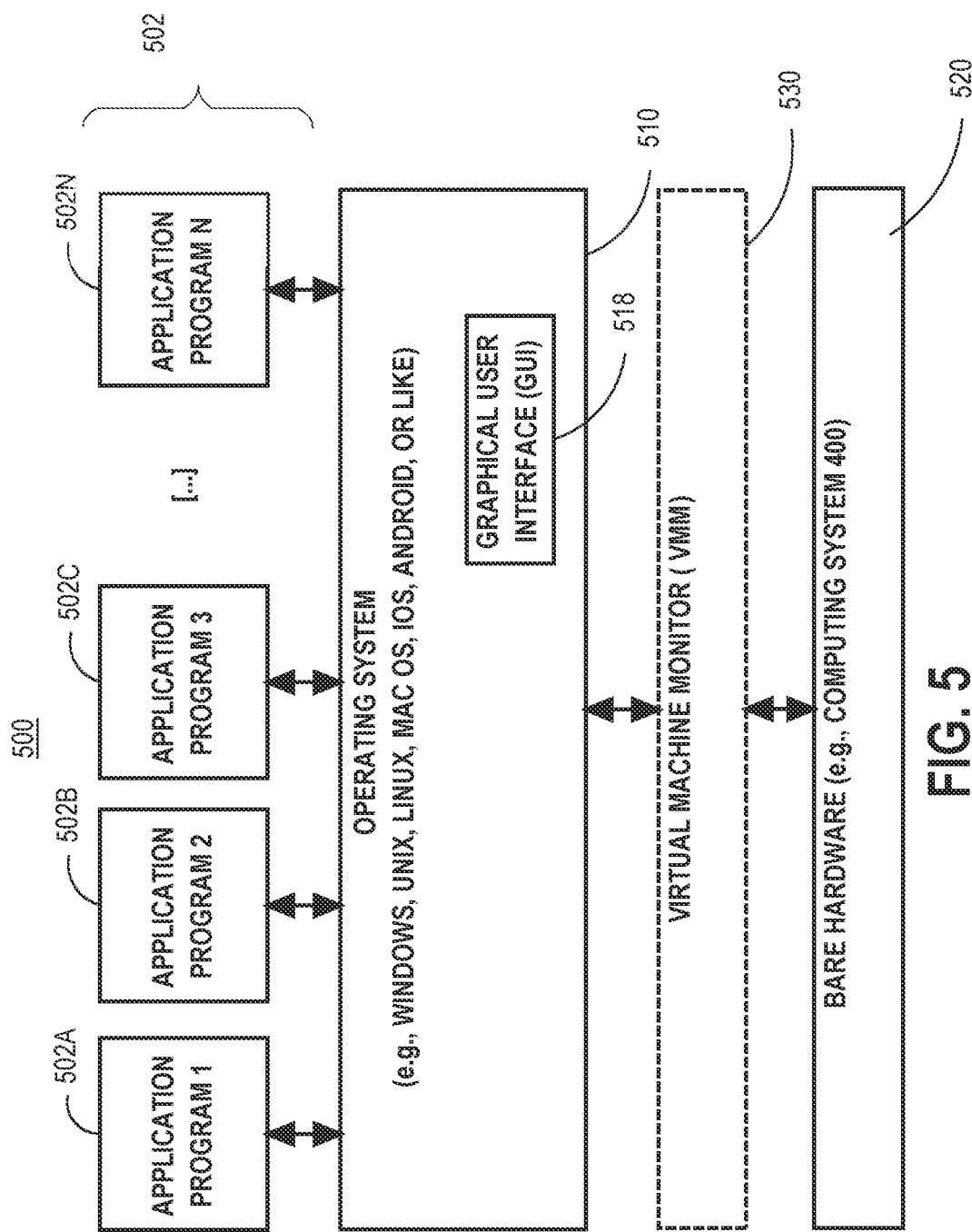
FIG. 5 depicts a software system that may be employed for controlling the operation.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 1106 and on fixed storage (e.g., hard disk or flash memory) 1110, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 1110 into memory 1106) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 1104) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
defining a first blockchain database object that includes:
   a blockchain key that includes a field of said first blockchain database object;
   a sequence number field;
   a blockchain hash field;
storing a plurality of user blockchains in said first blockchain database object, wherein each user blockchain of the plurality of user blockchains contains a respective plurality of records in said first blockchain database object, wherein each record contained in said user blockchain stores an identical blockchain key value in said blockchain key;
storing a respective series of sequence numbers for each user blockchain of said plurality of user blockchains in said sequence number field, wherein each record in said each user blockchain that is not a first appended record in said each user blockchain:
   stores a particular sequence number of said respective series of sequence numbers of said each user blockchain in the sequence number field, the particular sequence number specifying an order in which each record was appended to said user blockchain; and
   holds a cryptographic hash value in the blockchain hash field that cryptographically links said each record to a previous record in said user blockchain that holds a sequence number in said sequence number field that is consecutive and previous to another sequence number held in said sequence number field of said each record.

2. The method of claim 1, wherein:
a database contains said first blockchain database object;
a database dictionary of said first blockchain database object defines said blockchain key as including said field of said first blockchain database object.

3. The method of claim 1 further comprising:
receiving a request to insert a particular record into a particular user blockchain of said plurality of user blockchains;
performing commit time operations that include:
   accessing another record from said first blockchain database object that was last appended to said particular user blockchain, wherein accessing said another record includes:
      reading another cryptographic hash value from said blockchain hash field of said another record;
      reading another sequence number from the sequence number field of said another record;
   in said particular record:
      updating said sequence number field to a particular sequence number that is consecutive and subsequent to said another sequence number; and
      updating said blockchain hash field to a particular cryptographic hash value generated based on said another cryptographic hash value.

4. The method of claim 3, wherein:
an index on said first blockchain database object has an index key on said blockchain key;
said commit time operations include looking up said another record using said index using a particular blockchain key value corresponding to said particular user blockchain.

5. The method of claim 4, wherein
said index includes an index key on a last appended field of said first blockchain database object;
looking up said another record using said index includes using a non-null value to look up said another record in said index;
wherein said commit time operations include:
   updating said last append field of said another record to NULL; and
   updating said last append field of said particular record to said non-null value.

6. The method of claim 4, wherein said commit time operations includes locking said particular user blockchain.

7. The method of claim 6, wherein said commit time operations include obtaining in a particular order, a first lock on said particular user blockchain and a second user blockchain in a particular order.

8. The method of claim 7, wherein said second user blockchain comprises records stored in a second blockchain object.

9. The method of claim 7, wherein the commit time operations further include:
generating a first enqueue value based a particular blockchain key value associated with said particular user blockchain;
generating a second enqueue value based on a second blockchain key value associated with said second user blockchain;
wherein said particular order is based on an order of said first enqueue value and said second enqueue value.

10. The method of claim 9, wherein said generating said first enqueue value is based on an identifier of said first blockchain database object.

11. The method of claim 1, further including deleting records from a particular user blockchain in said first blockchain database object in response to a request to delete records in said particular user blockchain.

12. The method of claim 1, wherein said first blockchain database object is a database table.

13. The method of claim 1, wherein said first blockchain database object is a collection of documents.

14. One or more computer-readable non-transitory media storing one or more sequences of instructions that, when executed by computing devices, cause:
defining a first blockchain database object that includes:
   a blockchain key that includes a field of said first blockchain database object;
   a sequence number field;
   a blockchain hash field;
storing a plurality of user blockchains in said first blockchain database object, wherein each user blockchain of the plurality of user blockchains contains a respective plurality of records in said first blockchain database object, wherein each record contained in said user blockchain stores an identical blockchain key value in said blockchain key;

storing a respective series of sequence numbers for each user blockchain of said plurality of user blockchains in said sequence number field, wherein each record in said each user blockchain that is not a first appended record in said each user blockchain:
  stores a particular sequence number of said respective series of sequence numbers of said each user blockchain in the sequence number field, the particular sequence number specifying an order in which each record was appended to said user blockchain; and
  holds a cryptographic hash value in the blockchain hash field that cryptographically links said each record to a previous record in said user blockchain that holds a sequence number in said sequence number field that is consecutive and previous to another sequence number held in said sequence number field of said each record.

15. The one or more computer-readable non-transitory media of claim 14, wherein:
  a database contains said first blockchain database object;
  a database dictionary of said first blockchain database object defines said blockchain key as including said field of said first blockchain database object.

16. The one or more computer-readable non-transitory media of claim 14, wherein the one or more sequences of instructions include instructions that, when executed by said one or more computing devices, cause:
  receiving a request to insert a particular record into a particular user blockchain of said plurality of user blockchains;
  performing commit time operations that include:
    accessing another record from said first blockchain database object that was last appended to said particular user blockchain, wherein accessing said another record includes:
      reading another cryptographic hash value from said blockchain hash field of said another record;
      reading another sequence number from the sequence number field of said another record;
    in said particular record:
      updating said sequence number field to a particular sequence number that is consecutive and subsequent to said another sequence number; and
      updating said blockchain hash field to a particular cryptographic hash value generated based on said another cryptographic hash value.

17. The one or more computer-readable non-transitory media of claim 16, wherein:
  an index on said first blockchain database object has an index key on said blockchain key;
  said commit time operations include looking up said another record using said index using a particular blockchain key value corresponding to said particular user blockchain.

18. The one or more computer-readable non-transitory media of claim 17, wherein
  said index includes an index key on a last appended field of said first blockchain database object;
  looking up said another record using said index includes using a non-null value to look up said another record in said index;
  wherein said commit time operations include:
    updating said last append field of said another record to NULL; and
    updating said last append field of said particular record to said non-null value.

19. The one or more computer-readable non-transitory media of claim 17, wherein said commit time operations includes locking said particular user blockchain.

20. The one or more computer-readable non-transitory media of claim 19, wherein said commit time operations include obtaining in a particular order, a first lock on said particular user blockchain and a second user blockchain in a particular order.

21. The one or more computer-readable non-transitory media of claim 20, wherein said second user blockchain comprises records stored in a second blockchain object.

22. The one or more computer-readable non-transitory media of claim 20, wherein the commit time operations further include:
  generating a first enqueue value based a particular blockchain key value associated with said particular user blockchain;
  generating a second enqueue value based on a second blockchain key value associated with said second user blockchain;
  wherein said particular order is based on an order of said first enqueue value and said second enqueue value.

23. The one or more computer-readable non-transitory media of claim 22, wherein said generating said first enqueue value is based on an identifier of said first blockchain database object.

24. The one or more computer-readable non-transitory media of claim 14, wherein the one or more sequences of instructions include instructions that, when executed by said one or more computing devices, cause deleting records from a particular user blockchain in said first blockchain database object in response to a request to delete records in said particular user blockchain.

25. The one or more computer-readable non-transitory media of claim 14, wherein said first blockchain database object is a database table.

26. The one or more computer-readable non-transitory media of claim 14, wherein said first blockchain database object is a collection of documents.

* * * * *

UNITED STATES PATENT AND TRADEMARK OFFICE
CERTIFICATE OF CORRECTION

PATENT NO. : 12,182,100 B2
APPLICATION NO. : 18/476207
DATED : December 31, 2024
INVENTOR(S) : Loaiza et al.

It is certified that error appears in the above-identified patent and that said Letters Patent is hereby corrected as shown below:

On the Title Page

On page 2, Column 2, item (56) under Other Publications, Line 13, delete "retreived" and insert -- retrieved --, therefor.

In the Specification

In Column 5, Line 31, delete "DMBS," and insert -- DBMS, --, therefor.

In Column 9, Line 65, delete "(MondoDB™" and insert -- (MongoDB™ --, therefor.

Signed and Sealed this
Eighth Day of April, 2025

Coke Morgan Stewart
*Acting Director of the United States Patent and Trademark Office*